Figure 1:
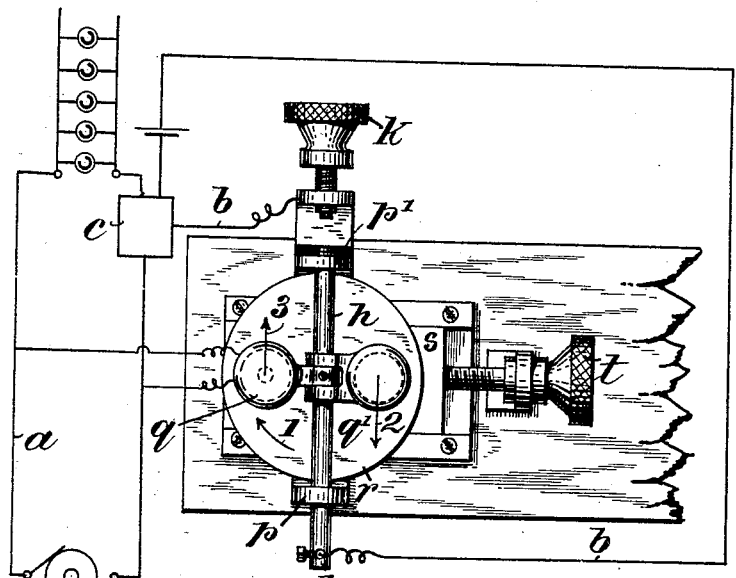

J. GARDNER.
TIME CUT-OUT.
APPLICATION FILED SEPT. 19, 1905.

912,555.

Patented Feb. 16, 1909.

Witnesses
Waldo M Chapin
May Bird.

Inventor
John Gardner
by Rosenbaum & Stockbridge
Attys.

UNITED STATES PATENT OFFICE.

JOHN GARDNER, OF FLEETWOOD, ENGLAND.

TIME CUT-OUT.

No. 912,555.  Specification of Letters Patent.  Patented Feb. 16, 1909.

Application filed September 19, 1905. Serial No. 279,181.

*To all whom it may concern:*

Be it known that I, JOHN GARDNER, a subject of the King of Great Britain and Ireland, and a resident of Fleetwood, in the county of Lancaster, England, have invented new and useful Improvements in Time Cut-Outs, of which the following is a specification.

These improvements relate to mechanism comprising a movable part whose period of movement may be varied, and which movable part is employed to effect any desired operation at any desired time after a certain event or its continuance. The desired operation may be, for example, the cutting out of an electric circuit, and the certain event may be the passage of a dangerously heavy current, and the object of the employment of the mechanism in this connection would be to prevent the protected circuit being cut out at the moment the unsafely heavy current passed, and only to permit the cutting out to be effected after the passage of the unsafe current for some time, which time may be predetermined and the mechanism set or regulated accordingly. The mechanism to be now described, however, and which is the subject of this invention, may be applied to other uses in which a certain movement or operation is desired to be effected after a time lapse.

The improved mechanism comprises a rotating part, preferably driven at low speed, such as a disk which is provided with a clutch or double clutch which or either of which may be caused to engage with any desired part of the constantly rotating disk and thus effect the movement in either direction at any convenient speed of an attached part, hereinbefore and hereinafter referred to as the movable part.

In a preferred form a slowly rotating disk has arranged above and across its face a movable part consisting of a bar or the like capable of moving axially. Attached to this movable part and projecting one to each side, preferably to equal distances, are two frictional clutch devices either or both of which may engage with the disk with equal or varying forces on opposite sides of the center of the disk. If the two clutch devices engage with the disk with equal force and at equal distances from the periphery of the disk with the sliding movable part disposed across the center of the disk, then no movement of the movable part takes place, as the engagement of one clutch tends to set up motion in one direction while that of the other clutch equally tends to set up motion in the other direction, and equilibrium is established.

It is preferred to form one clutch to constantly engage with the disk with a constant force and to bring the other into action when desired with a force which is greater than that continuously exerted by the constant clutch. Such clutches may be mechanical in their direct operation upon the disk, but operated by electrical or electro-magnetic devices which are energized by any suitable shunt, local, or other electric current which is varied or strengthened by the occurrence of the event which is to be followed—after a certain time or after a certain period of continuance—by the desired operation as a consequence of the movement of the movable part.

The clutches may be so set that their relative positions upon the disk may be varied so as to subject them to different linear velocities, or so that the linear velocity of the disk may act differentially through the clutches upon the axially sliding movable part. This may be accomplished by so mounting the axial movable part that it may be moved laterally across the disk.

The clutch device may consist of two magnets, one of which is electrically energized from a local, shunt, or other circuit whose current is varied or augmented upon the occurrence of the event, and the other of which may be a weaker permanent magnet or weaker continuously energized electromagnet. The local, shunt, or like circuit energized magnet may have its power varied from zero or a strength less than that of the other magnet to a stronger power than such magnet. Either magnet may thus in turn be stronger than the other so that the movable part may be moved in either direction. With such a magnetic device the rotating disk may be of magnetic metal and it may slide or rotate in contact with the magnet poles, or it may be acted upon inductively and effect a varying grip or pull either by direct magnetic action or as a result of the electric currents set up in the disk, which in this latter case may be a non-magnetic electricity conductor. Slip of course is permitted between the clutches and the disk and stops may be set to limit the motion of the movable part whose displacement to a certain distance effects the desired operation.

The desired operation may be effected by the movable part coming against another part which may mechanically, electrically, or otherwise effect the operation. Further variation of time may be obtained by adjusting the position of such part with which the moving part is adapted to engage, or by altering the speed of the disk.

The constant electro-magnet or clutch hereinbefore described may be replaced by a spring, weight, or equivalent which always tends to keep the moving part in its inoperative position until the occurrence of the event energizes or strengthens the operative magnet. The rotating disk may only be caused to rotate by a suitable electro-magnetic or other device upon the occurrence of the event, instead of being constantly rotated as before stated.

Other clutches than electro-magnetic or electrically operated may be used, the operative variable clutch being caused to mechanically engage with the rotating part with an increase or decrease of strength upon the occurrence of the event and thus effect the desired movement of the movable part.

Other forms of movable part than that described may be employed.

The accompanying drawings illustrate the preferred form of mechanism provided with two magnetic clutches, and disposed to operate a cut-out or the like to open or close an electric circuit.

I will first describe the construction and operation of the apparatus or mechanism and later will describe the operation of the electric cut-out.

Figure 2:
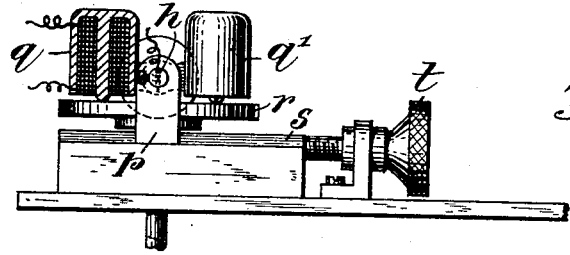
Figure 3:
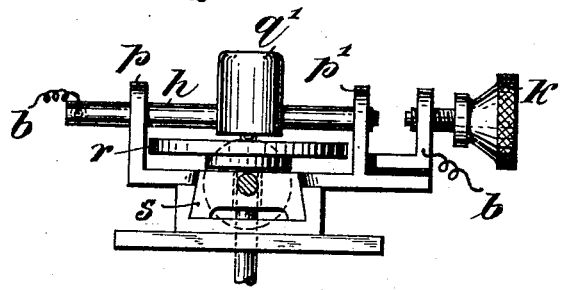
Figure 4:
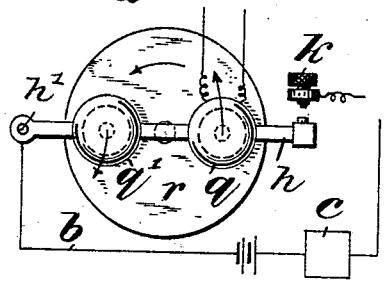

Referring to the drawings, Figure 1 shows one form of the improved mechanism in plan; Fig. 2 shows it in elevation with the electro-magnetic clutch in section the inner pole in contact with the disk and the outer pole just clear of it; and Fig. 3 illustrates it in elevation at right angles to Fig. 2. Fig. 4 shows a modified form of movable part.

The movable part $h$ is an axially movable contact rod supported in suitable brackets or bearings $p$ and $p^1$. Attached to the rod $h$ so that they move axially with it and with one another are the magnets $q$ $q^1$. Below them is the disk $r$ of magnetic metal capable of being rotated slowly in such a manner as to be engaged by the magnet poles which rest upon it. The magnets rest on the disk by their own weight and may be hinged to the movable part and partake of the axial movement of such part or they may be solid with it. In the latter case it is desirable that the bearings of the movable part shall be slotted or otherwise formed to permit the rise and fall of the clutches and the attached movable part and to admit of good contact of the clutches with the disk. One of the magnets $q^1$ is a permanent magnet, or is an electro-magnet which is constantly energized when the device is in use.

$q$ is an electro-magnet which is energized when the certain event occurs as will be hereinafter described. The power of this magnet when energized is greater than that of the magnet $q^1$. When no current is passing through the magnet $q$ and the disk is slowly rotating in the direction indicated by the arrow 1, the contact rod $h$ is maintained in the position shown in Fig. 1 by the greater hold of the permanent magnet upon the disk forcing this magnet and the attached rod in the direction of the arrow 2, the magnet $q$ being inoperative. The movement of the rod in this direction is limited by a suitable stop. When the magnet $q$ is energized to a greater extent than the permanent magnet $q^1$ it exercises the greater force upon the disk $r$, the pull or power of the permanent magnet $q^1$ is overcome, and the rod moves towards the contact $k$ or to contact making position owing to the magnet $q$ being pulled in the direction of the arrow 3 by the rotating disk. When the magnet $q$ has been energized for a certain predetermined time the rod $h$ moves completely over and closes the local electric circuit $b$ of which it is part by coming into contact with the terminal $k$. When the magnet $q$ is deënergized owing to the termination of the event or from other cause, the permanent magnet $q^1$ is again the stronger and comes into action, and the movable part $h$ returns towards the position illustrated in the figures. The rod is thus moved in either direction according to which magnet is stronger than the other. The time taken by the rod $h$ to move either to its contact making position or to return to the position of rest or open position may be varied as desired by adjusting the contact $k$ or the speed of the disk.

It may for some uses be desired to vary the ratio between the times occupied by the contact closing and opening movements, and to permit this the rod and its attached magnets and contacts may be moved bodily to the right or left of the positions occupied in Figs. 1 and 2.

As shown in Figs. 1 and 2 the rod $h$ passes over the center of the disk $r$ and the inner poles of the magnets $q$ and $q^1$ are in contact with parts of the disk at an equal distance from the center and moving at equal speeds. Should the rod and its magnets be moved to the right, the permanent magnet pole increases its distance from the center of the disk and the electro-magnet pole comes nearer the center. The magnet $q^1$ is thus in contact with a part of the disk which has a greater speed than that part of the disk with which the magnet $q$ is in contact, and consequently the opening movement of the rod will be performed in quicker time than the closing or contact making movement. Similarly, if the rod is moved to the left of the center, a quicker movement may be given to the rod while it is making contact. So that the required transverse movement of the rod $h$ and its magnets may be easily effected, the brackets $p$ and $p^1$ in which the rod is mounted are attached to a slide $s$ which may be moved to the right or to the left within the frame by means of an adjusting screw $t$. The slide $s$ is slotted to permit it to pass the shaft on which the disk is fixed. Thus by the screw $t$ and the adjustable contact $k$ any desired adjustments or variations may be effected.

The permanent magnet may be replaced by a simple contact frictional device or part if desired, and the electro-magnet may be substituted by any other part capable of exerting a variable grip upon the disk $r$, such variable grip being affected by the passage of a current due to the occurrence of the event. With simple frictional devices the disk $r$ need not be of magnetic metal.

In every case, of course the friction or pull between the magnets or their equivalents and the rotating disk is of such a nature as to permit the required slip.

In Fig. 1 the mechanism is shown as applied for use to operate an electric cut-out and open an electric circuit when a dangerously heavy current has passed through the circuit for a certain or predetermined time.

$a$ represents the electric circuit which is to be protected and opened after the passage and certain duration of a dangerously heavy electric current. The electro-magnet $q$ of the mechanism is contained in a protected derived circuit from the main electric circuit.

$b$ is a local electric circuit which contains the axially movable part $h$, the adjustable contact $k$, and the cut-out $c$ governing the electric circuit $a$. This cut-out may be of any known or convenient construction.

With the normal or a lesser current passing through the circuit $a$ the electro-magnet $q$ is insufficiently energized to overcome the attraction of the permanent magnet $q^1$ and the movable part $h$ is therefore maintained in the position illustrated by means of the rotating disk $r$. The cut-off $c$ is in a position to permit the passage of the current through the circuit $a$. When the electrical conditions become abnormal in the circuit $a$ the electro-magnet $q$ is energized sufficiently to overcome the pull of the permanent magnet $q^1$ and the movable part $h$ is moved, as a consequence of the rotation of the disk $r$, in the direction of the contact $k$. If the abnormal conditions persist for the length of time for which the instrument is set, the movable part $h$ and the contact $k$ will be brought together, the local circuit $b$ will be closed and the cut-out $c$ will be operated to open the circuit $a$.

I have shown the circuit of the magnet $q$ as bridged across the opposite terminal wires of the circuit $a$. It is evident that it may be included directly in the circuit $a$ if desired, and I do not desire to be limited or restricted to either specific arrangement.

Should the abnormal conditions continue for a very short period of time which will not endanger the circuit or its contained lamps or instruments, the movable part $h$ will not move sufficiently to come against the contact $k$, and upon the cessation of the abnormal conditions the electro-magnet $q$ ceases to be energized in excess over the permanent magnet, and the movable part $h$ returns to its position shown in the drawings, and the cut-out is not operated.

In the modification shown in Fig. 4 the movable part $h$ previously described and illustrated as an axially movable rod, consists of an arm or rod $h$ which is hinged at $h^1$. It is included in a local electric circuit. The rod passes over about the center of the disk $r$ and carries the two magnetic clutches $q$ and $q^1$.

$k$ represents the fixed contact with which the movable part may be brought into contact. According to which clutch has the greater grip of the disk, the arm or part $h$ is moved towards or away from the contact $k$. To vary the ratio of the speeds of the two movements of the part $h$ this part may be moved in either direction in the direction of its length. This may be easily accomplished by mounting the part $h$, the magnets $q$ and $q^1$, and the contact $k$ on an adjustable slide equivalent to $s$ in the former figures.

The magnetic clutches hitherto described have had only one member varied in strength upon the occurrence or cessation of an event. Both magnets, however, may be electromagnets and may have their strength varied.

The described use of the mechanism is only given as a type, as the mechanism may be similarly used to perform many other operations, either electrically through the medium of a local electric circuit and instruments, or mechanically as by the direct action of the movable part $h$ or its equivalent. The electro-magnet $q$ will be included in an electric circuit the current of which is changed or modified as desired upon the occurrence of the event after the duration of which for a certain time the desired operation is to take place. Or the variable clutch which may be used in substitution for the electro-magnet $q$ may be otherwise affected on the occurrence of the event.

What I do claim as my invention and desire to secure by Letters Patent is:—

1. In a time cut out, a continuously rotatable disk, means for frictionally engaging such disk at two points on opposite sides of a diameter of such disk, the engagement at one of such points being of variable force, and a movable part carrying the frictional engaging means and movable in one direction or the other, according to which of the said engaging means exercises a preponderating force on the disk.

2. In a time cut out, a continuously rotatable magnetic disk, two magnets arranged in magnetic relation to such disk on opposite sides of a diameter thereof, one of said magnets being of variable strength, and a movable part carrying the magnets and displaceable in one direction or the other, according to which magnet exercises a preponderating force on the disk.

3. In a time cut out, a continuously rotatable magnetic disk, a pair of magnets arranged in magnetic relation to such disk on opposite sides of a diameter thereof, both of said magnets being of variable strength, and a movable part carrying the magnets and displaceable in one direction or the other, according to which magnet exercises a preponderating force on the disk.

4. In a time cut out, a continuously rotatable magnetic disk, two magnets arranged in magnetic relation to such disk on opposite sides of a diameter thereof, a movable part carrying the magnets and displaceable in one direction or the other, according to which magnet exercises a preponderating force on the disk, and adjusting devices by which the magnets may be adjusted transversely to said diameter.

In testimony whereof I have signed my name to this specification in the presence of two subscribing witnesses.

JOHN GARDNER.

Witnesses:
  WILLIAM GEO. HEYS,
  I. O'CONNELL.